(12) United States Patent
Constien

(10) Patent No.: US 6,259,932 B1
(45) Date of Patent: Jul. 10, 2001

(54) HAND-HELD TELEPHONE WITH COMPUTER MODULE

(75) Inventor: Hans-Peter Constien, Berlin (DE)

(73) Assignee: Constin Design GmbH, Berlin (DE)

( * ) Notice: Subject to any disclaimer, the term of this patent is extended or adjusted under 35 U.S.C. 154(b) by 0 days.

(21) Appl. No.: 08/982,504

(22) Filed: Feb. 2, 1998

Related U.S. Application Data

(63) Continuation of application No. PCT/DE96/01005, filed on Jun. 3, 1996.

(30) Foreign Application Priority Data

Jun. 2, 1995 (DE) .............................................. 195 20 947

(51) Int. Cl.$^7$ ...................................................... H04B 1/38
(52) U.S. Cl. ............................. 455/556; 455/575; 455/90
(58) Field of Search ................................... 455/556, 557, 455/575, 90, 558, 566

(56) References Cited

U.S. PATENT DOCUMENTS

| | | |
|---|---|---|
| 5,189,632 | 2/1993 | Paajanen et al. . |
| 5,303,291 | 4/1994 | Takagi et al. . |
| 5,324,925 | 6/1994 | Koenck et al. . |
| 5,414,444 | 5/1995 | Britz . |
| 5,719,936 * | 2/1998 | Hillenmayer ........................ 379/447 |
| 5,797,089 * | 8/1998 | Nguyen ................................ 455/403 |
| 5,896,575 * | 4/1999 | Higginbotham et al. ............ 455/566 |

FOREIGN PATENT DOCUMENTS

| | | |
|---|---|---|
| 4108169A1 | 9/1991 | (DE) . |
| 4017690A1 | 12/1991 | (DE) . |
| 0472361B1 | 8/1991 | (EP) . |
| 0651544A2 | 10/1994 | (EP) . |
| 2669131A1 | 10/1990 | (FR) . |

OTHER PUBLICATIONS

IBM Technical Disclosure Bulletin, vol. 37, No. 6A, Jun. 1, 1994, New York pp. 449–453, "Personal Communicator Configurations".

* cited by examiner

Primary Examiner—Daniel S. Hunter
Assistant Examiner—Darnell R. Armstrong
(74) Attorney, Agent, or Firm—Birch, Stewart, Kolasch & Birch LLP

(57) ABSTRACT

A portable computer and telecommunications equipment unit has the functions of a mobile telephone and a computer in a single apparatus. Both functions can be used in an optimum manner either separately or simultaneously. The modular computer and telecommunications equipment is approximately the size of an elongated wallet and has a top module with a telecommunication system. The outer face of the top module carries a telephone keyboard and a telephone display, and its inner side carries a flat display that acts as a computer display. The equipment further has a second underlying module that contains a computer. The top and underlying modules are pivotably interconnected by a hinge. Additional modules that constitute functional extensions or additional energy supply units may be mounted on or in the second module.

14 Claims, 6 Drawing Sheets

HAND-HELD TELEPHONE WITH COMPUTER MODULE

This application is a continuation of PCT application no. PCT/DE96/01005 filed on Jun. 3, 1996, which designated the United States and on which priority is claimed under 35 U.S.C. § 120, the entire contents of which are hereby incorporated by reference.

FIELD OF THE INVENTION

The invention relates to a portable device that can be used as a personal computer and for telecommunication comprising a hand-held telephone and a personal computer.

Portable personal computer and telecommunication devices of this type are particularly used for mobile telecommunication, writing and transmitting telefax messages as well as for on-line information services and as mobile personal computers.

DESCRIPTION OF THE BACKGROUND ART

In general usage are portable mobile telephones (in German usually called "handy" because they can be operated with one hand) and a large number of small size devices as pocket calculators, data bases and electronic notepads which can be carried along for personal usage due to their very small dimensions. Personal computers with displays that produce texts or graphics are known in the size of laptops or notebooks. But even these still have a size of DIN A 4 (German standard paper size) and are rather heavy.

A similar, portable device that can be used as a personal computer and for telecommunication is known from the EP 0 472 361 B1. It comprises a personal computer member and a mobile telephone being integrated into one housing which also contains a keyboard member for operating both the computer and the mobile telephone. A lid which covers a display when it is closed is pivoted on the housing. The lid is shaped in such a way that in its open position it leaves accessible a part of the display and also at least some of the keys of the keyboard member so that the device can be used in its function as a mobile telephone. The microphone for the telephone member and the speaker are situated on one of the long sides of the housing.

The disadvantage of the above mentioned device described in the EP 0 472 361 B1 is that it can not be used in the same way as usual mobile telephones of the type of a hand-held telephone because the arrangement of the keys for operating the telephone as well as the arrangement of the microphone and the speaker are different in comparison with other mobile telephones. Particularly, it is not possible to operate the telephone member of the deice with only one hand, as it is characteristic for mobile telephones of the type of a hand-held telephone, because in order to operate the telephone the deice has to be turned at first by 90° with respect to its longitudinal axis and after that by 90° with respect to its transversal axis.

In respect of its functions this device can not be extended, and it is not possible to connect additional power modules to it that would provide for a longer run.

In the DE 41 08 169 A1 a telephone was published which represents a mobile communication device that can be operated as a mobile radio telephone in connection with a personal computer and data transfer.

Another device which can either be carried along or be installed in a vehicle consists of a computer with a keyboard and a send-receive unit for a radio telephone or a car telephone and comprises a flap, similar to that of a laptop, on the front part of which there is a display. On the back side of the flap there is a holder for a hand-held telephone which on one side juts out with respect to the flap. When the flap is closed it covers the computer keyboard and the hand-held telephone is accessible and can be taken off. The keys for the telephone and for operating the computer which are situated on the upper side of the telephone are accessible. If the flap is lifted and forms a specific angle with the rest of the housing the computer keyboard is accessible and the mouthpiece and earpiece of the telephone being fixed to the back side of the flap are in front of a person looking in the direction of the display. This way the sound waves can without hindrance communicate between the user and the earpiece and mouthpiece of the telephone.

The disadvantage of this solution is that it is not possible to use this device as a mobile telephone. It has from the beg been developed as a device comprising two completely separate parts (a hand-held telephone and a laptop) being linked together. Also, as a result of its jutting out parts this device is highly sensitive to shock, especially in the case when it falls down.

SUMMARY OF THE INVENTION

The aim of the invention presented here is to offer a device that can be used as a personal computer and for telecommunication as well which is able to send, receipt, produce and process speech, data, texts and/or graphics. In other words, the invention tries to connect the functions of a mobile telephone with the functions of a personal computer within only one device. Also, it in intended that the present deice can be extended by additional devices for the usage of additional functions.

This task is being solved by the invention of a portable device that can be used as a personal computer and for telecommunication.

As the computer member and the telecommunication member are intended to be two seperate parts, it is possible to develop both members with their respective electronic modules separately or to use already existing modules, e. g. for the telecommunication member, after adjusting them only slightly. This means that the effort in respect of development and construction will be very much reduced. Another plus is that the user of the invented portable device can operate it in a very flexible way when using it as a facsimile, a modem, a telephone or a data processing machine or when making use of all possible combinations of its different functions. Also, the device is very easily and comfortably to handle.

The user can either operate the two members of the device seperately or at the same time as for instance when writing and sending a facsimile message by the help of the respective data processing programme. On the other hand, it is always possible to use the telephone module when the device is in its closed position because the keys for the telecommunication unit are situated on the outer surface of the respective module. This means that the device according to the invention is as handy as a usual mobile phone and fictions as a personal computer in connection with a telecommunication device.

The separation of the computer and the telecommunication member in different modules and the arrangement of the respective keyboards and displays allows a minimum of data lines connecting the personal computer with the telecommunication unit. Thus the constructional effort is reduced and the risk for damages and problems concerning the data transfer between the computer module and the telecommunication module is very low.

If the computer display will be integrated into the member containing the telecommunication module the arrangement of the computer keyboard and the computer display will be equivalent to that of a usual notebook which means very ergonomic working conditions with the computer of the invented device.

It will be much more comfortable to handle the device, especially when using it in its function as a mobile phone, if in a closed position the outer surfaces of the device consisting of at least two members lie in one line (if no part of the device is jutting out).

This way the keyboard of the computer and the computer display are protected against dirt. Also, this arrangement guarantees a safe protection of the computer display from manual damage.

It is possible to extend the invented device by additional modules, as for instance power storage modules, data storage modules, data processing modules, disk drives, hard disk modules, radio- or tv-tuning modules, chip card or magnetic card readers, PCMCIA-slots or other communication devices as for instance an additional mobile radio unit for later usage via satellite. These modules can be carried along as additional parts to the main telecommunication unit, if the user wishes. The power storage unit can either be a seperate module that is adjusted to the computer module or it can e.g. be an accumulator which is integrated into the computer module.

If a microphone and a speaker are arranged on one of the outer surfaces of the invented device consisting of at least two members and if they will be connected to the telecommunication module, the device can be used as a mobile telephone which has all the functions mentioned above that are characteristic for mobile phones. In the case if the microphone and the speaker are being arranged on the outer surface of the telecommunication member, i. e. on one line with the keys and the display of the telephone, the advantages are, as mentioned before, that the device will be very easy to handle and that the constructive effort will be reduced. In the case if the microphone and the speaker are being arranged on the back side of the device, i. e. on the outer surface of the member containing the computer, the advantages are that the existing room can be used for the installation and that there are less restrictions concerning the design of the member containing the telecommunication unit.

It is especially convenient if the device comprises an additional switch with the help of which it is possible to carry out a so called hands free call. Thus the device can in the open position be used am a personal computer and as a mobile telephone at the same time. By means of this it will also be easier to use the function of the address storage which is integrated into the computer storage for providing telephone connections by chosing the numbers directly out of the address storage of the computer.

In the following some advantageous embodiments of the discussed invention are being described.

The size of the device according to the invention is about the same as of a longish wallet. The main version consists of three members being connected with one another. The upper member comprises a telecommunication unit and on its outer surface there are the keys for operating the telephone, a telephone display, a microphone and a speaker which serves as an earpiece. A second member of the device contains a personal computer and a slot e. g. for cards of the size of cheque cards, for magnetic cards or for storage cards of PCMCIA standard. The upper member and the second one adjacent to it are connected by a hinge. The device according to the invention comprises a third member consisting of an accumulator which provides energy. Further, the device has a movable antenna which is integrated into the hinge connecting the upper member and the member adjacent to it or being part of the hinge. The upper member containing the personal computer has also a button for adjusting the volume of the speaker and a key allowing the user to communicate after the dial tone.

If the device according to the invention is in its open position the lifted upper member reveals on its inner surface a computer display and the second member which is connected to the upper one by a hinge comprises a computer keyboard on the side adjacent to the upper member. The lines and columns of the keyboard and the computer display are arranged in such a way that the lines are parallel to the long side of the device according to the invention.

On one of the front surfaces of the device there are one or several interface connections, e.g. for data transfer with other computers via serial, parallel interfaces or infrared interfaces. As the device according to the invention consists of several independant members it is without any problem to extend the device by additional energy modules, storage members or other modules with integrated cards for additional functions of the personal computer. It is also possible to add to it other functions like e.g. radio or tv reception. The computer display unit is a liquid crystal display or a similar display that can also be built narrowly. The display can also be constructed as a so called touchscreen which means that it reacts when being touched, so that it provides for additional functions or operating keys. It is also possible, of course, to have normal operating keys which are arranged besides their corresponding display sections.

The device according to the invention can in its closed position be used as a usual hand-held telephone. Alternatively, due to the arrangement of lines on the computer display and the keyboard, she device can also be used as a normal personal computer. It is intended to have a data transfer between the telecommunication member and the computer member for an automatic access to the telepone numbers e.g. which are memorized in the computer. Also, facsimile messages that have been written by means of the computer programme can be transmitted directly from there via the telecommunication unit.

Further, with the personal computer it is possible to create on-line connections to the respective services directly via the telecommunication unit.

An alternative device according to the invention which is built in a similar way as the one described above comprises a power storage instead of a separate power module, as for instance an accumulator being integrated into the computer member. Thus the outer dimensions become smaller and the arrangement of the different components of the personal computer member and the telecommunication unit will be improved. It is also possible to conceal the power storage by integrating it completely into the housing of the computer member.

In one of the embodiments of the device according to the invention the microphone and the speaker are situated on the outer surface of the computer member while the telecommunication unit fits into the upper member of the device. Depending on the room available in the two upper members the microphone and the speaker can either be installed in the upper member containing the telecommunication module or in the member adjacent to it containing the computer.

Another embodiment of the device according to the invention consists, as the variations mentioned above, of one member with the telecommunication unit and a a second containing the computer, but it comprises also a third member containing a unit for power storage as e.g. an accumulator. In addition to the devices described so far a different embodiment can be presented in which the third member contains e.g. an additional storage in the form of storage chips. But the third member can as well consist of an additional power storage which would help increase the operating time of the computer and the telephone considerably.

In another embodiment of the invention the upper member contains a microphone which opens to the outer surface as well as to the inner surface of the respective member. Thus it is possible to use the device in its closed position as a normal mobile telephone and on the other hand it can in the open position also be used for "hands free calls" after operating the respective switch. In this case speech will be recorded by the microphone which is situated on the inner surface of the upper member, The speaker of the upper member can in this case be used as an earpiece when operating the telephone as well as a speaker when using the computer. The volume of the speaker can be adjusted by the volume regulator.

In another embodiment of the device according to the invention the outer surface of the upper member looks in the closed position like a normal hand-held telephone with keys and a display showing telephone numbers or different functions chosen by the user. This device comprises an audio socket for headphones or earphones or other fitting speakers. If using a combined in- and out-socket a combined microphone/headphone deice can be connected to the device according to the invention. All described so far embodiments have a telescopic antenna. If the user does not need the telecommunication unit the antenna can be removed into the hinge which conceals it. It would not be necessary to draw out or to insert the antenna in the case if it would be completely integrated into the housing because the functions of sending and receiving would still operate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitive of the present invention, and wherein.

DETAILED DESCRIPTION OF THE PREFERRED EMBODIMENTS

Figure 1:
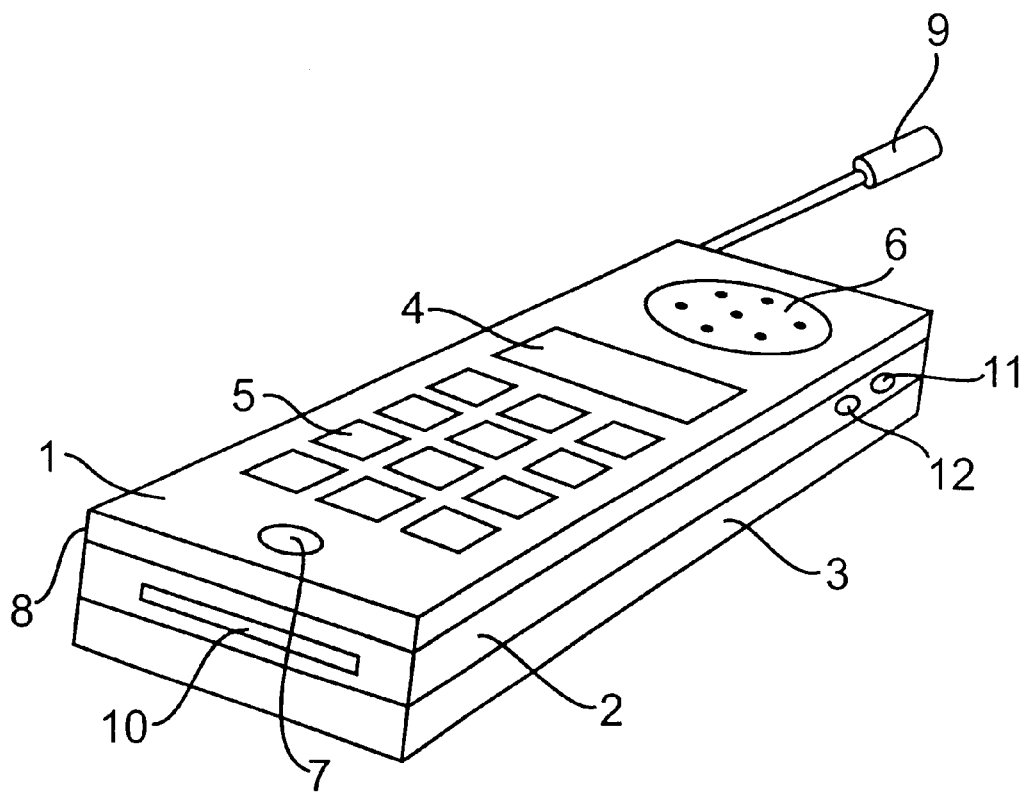
FIG. 1 shows a portable device according to the invention which has a computer member and a telecommunication unit.

In the FIGS. 1 to 6, corresponding parts use the same reference numeral.

FIG. 1 shows a device according to the invention which has about the size of a longish wallet. The device according to the invention includes three members which are linked together. Member no. 1 contains a telecommunication unit, and on its outer surface there are keys 5 to operate the telecommunication unit (i. e. telephone keys), a telephone display 4, a microphone 7 and a speaker 6 functioning as an earpiece. Member no. 2 contains a personal computer and a slot e.g. for cards of the size of cheque cards, other magnetic cards or also for storage cards of the PCMCIA standard. Member 1 and member 2 are movably connected by means of a hinge 8. Further, the device according to the invention comprises a member no. 3 having of an accumulator which supplies energy.

Also, the device according to the invention comprises a telescopic antenna 9, which is situated in the axle of the hinge 8 and which is at the same time part of the hinge 8. Member no. 2 has a button for adjusting the volume of the speakers 6 and a key 12 which enables the user to speak after the dial tone.

Figure 2:
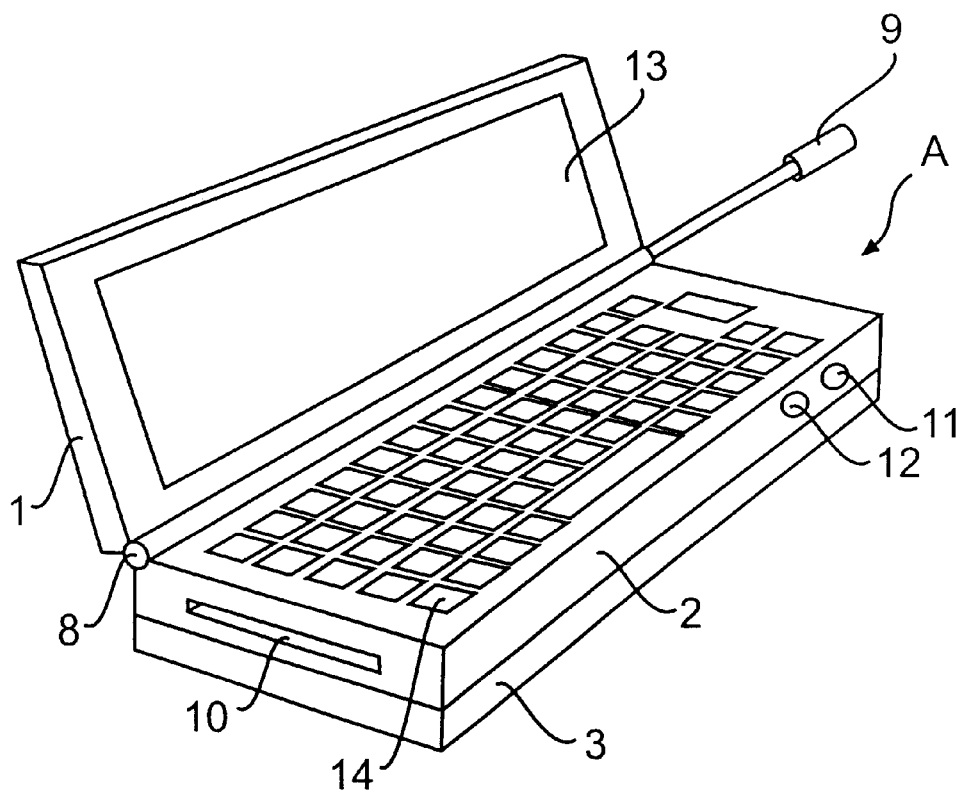
FIG. 2 shows the same device as FIG. 1.

FIG. 2 shows the same device according to the invention in an open position. On the inner surface of member 1 there is a computer display 13, and on the side of member 2 which is adjusted to member 1 there is a computer keyboard 14. The fines and the columns of the computer display 13 and the keyboard 14 are arranged in a way that the lines are parallel to the long side of the device according to the invention.

Arrow A shows more interface connections, e.g. for data transfer with other computed via serial, parallel interfaces or infrared interfaces. They are situated on the front surface of the device and can not be seen in this figure. Due to the modular structure of the device according to the invention it is without problems possible to extend the device by additional energy modules, storage modules or other modules with integrated cards in order to achieve additional functions of the coumputer. Also, it is possible to include functions for radio or tv reception. The computer display consists of a liquid crystal display oder a similar display which can be built in a narrow way. It can also be built as touchscreen in order to achieve additional functions or functional keys for operating the display. It is also possible, of course, to have normal keys which have to be operated mechanically and are arranged besides their corresponding display sections.

In the closed position the device according to the invention can be used as a normal mobile phone. Due to the arrangement of the computer display 13 and the display unit of the computer 14 in lines it is possible to use the device as a usual personal computer. The device is intended to have data transfer between the telecommunication unit and the computer member in order to chose e.g. telephone numbers automatically out of the computer storage. Also, it is possible to transmit facsimile messages, which have been written on the personal computer, directly out of the used application programme via the telecommunication unit. Further, it is possible to produce on-line connections with the respective services directly by the help of the telecommunication unit.

Figure 3:
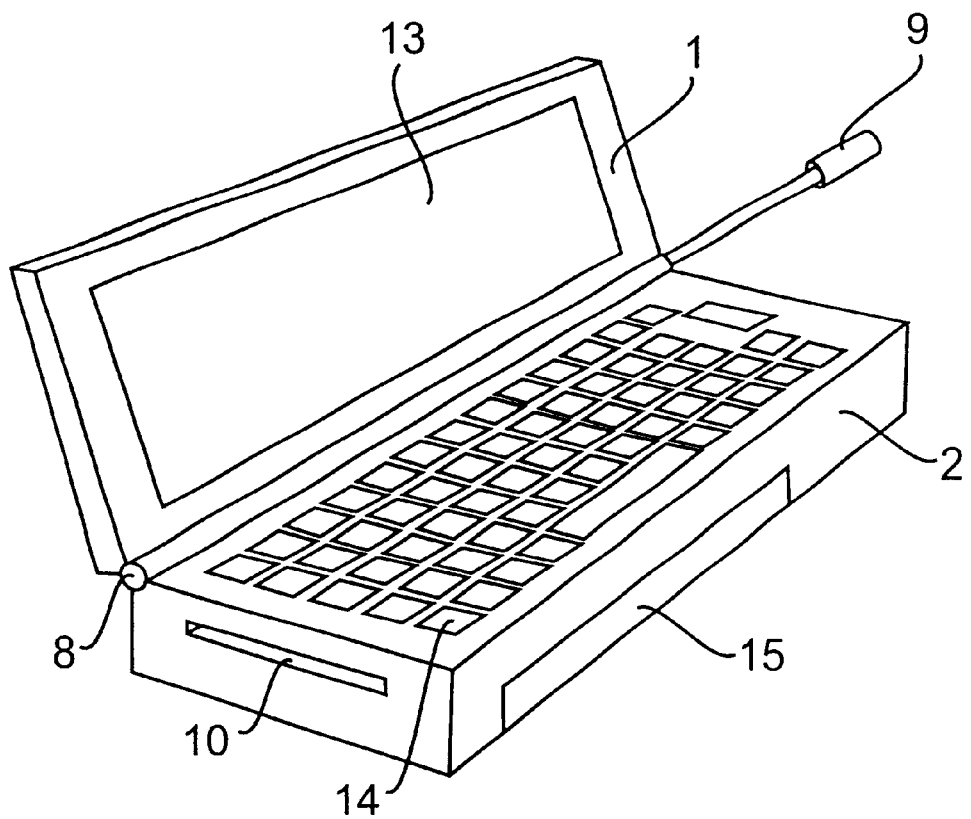
FIG. 3 shows another embodiment of the device according to the invention.

FIG. 3 shows a device according to tie invention which is similar constructed as in FIGS. 1 and 2. Instead of a separate energy module 3 in this case a power storage module 15, for instance an accumulator, is integrated into the computer member 2.

This solution allows small dimensions of the device and an approvable arrangement of the different components of the computer module and the telecommunication unit. The power storage unit 15 can as well be completely integrated into the housing of the computer member.

Figure 4:
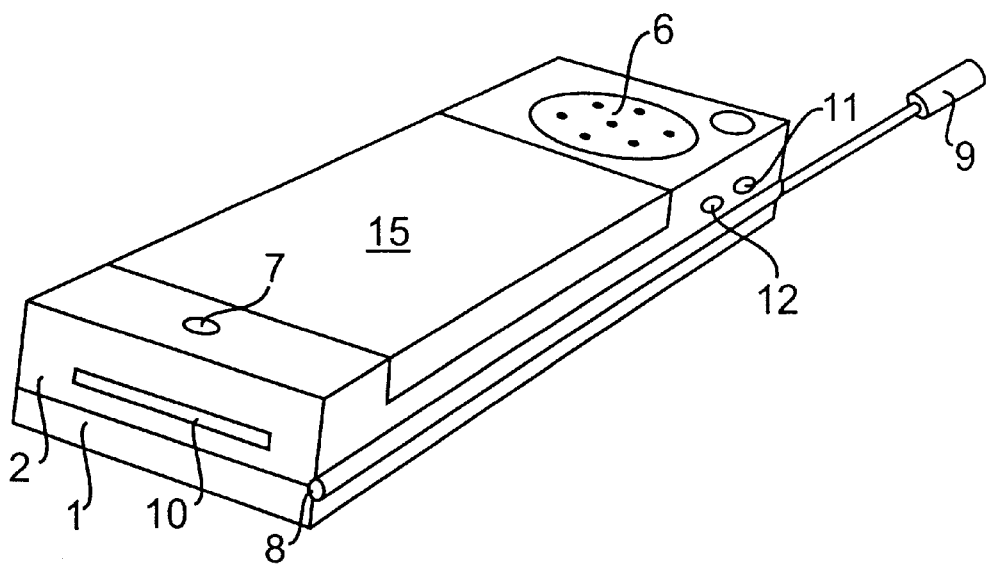
FIG. 4 shows the same device according to the invention as FIG. 3.

FIG. 4 shows the device shown in FIG. 3 from the other side. Here one can see in which way the power storage unit 15 is integrated into the computer member 2. With the embodiments of the invented device shown in FIGS. 3 and 4 the microphone 7 and the speaker 6 are situated on the outer side of the member containing the computer 2, while in accordance with the invention the telecommunication unit is contained in member 1. Depending on the available room in the members 1 and 2 it can either be more useful to have the microphone 7 and the speaker 6 in the same member which contains the telecommunication unit, as shown in FIGS. 1 and 2, or to integrate them into the member containing the computer.

Figure 5:
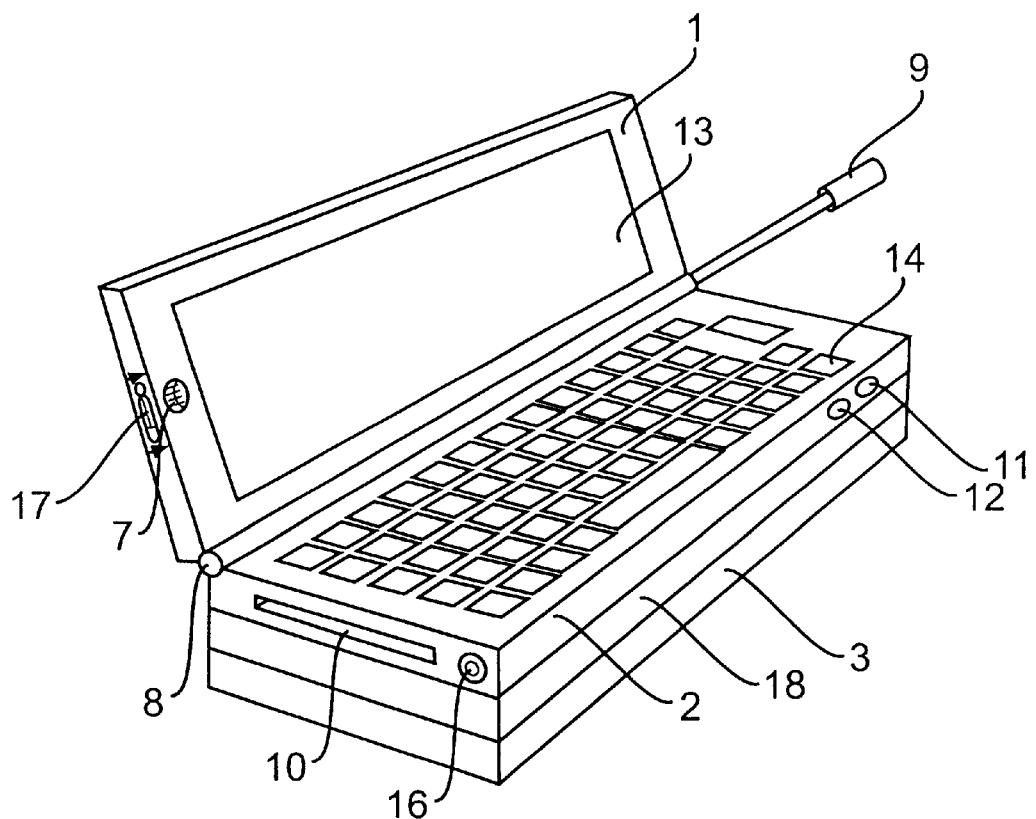
FIG. 5 shows another embodiment of the device according to the invention.

FIG. 5 shows another device according to the invention. As the embodiments mentioned above, it comprises a member 1 with the telecommunication unit, member 2 with the personal computer and member 3 containing the power storage unit, as for instance an accumulator. But different from the FIGS. 1 to 4 in that this figure shows a device which is extended by an additional member 18 which can e.g. contain an additional storage from storage chips. It is possible, however, that the additional member 18 comprises another power storage unit which would increase the run of the device considerably.

This figure shows one more difference from the embodiments shown in FIGS. 1 to 4: Member 1 contains a microphone which is directed to the outside as well as to the inner side of the module. This way it is possible to use the device in the closed position as a usual mobile phone and in the open position it is possible to communicate after operating a button for so called free hands call 17. Speech will be recorded by the microphone which is situated on the inner side of member 1. The speaker of member 1 can in this case be used as an earpiece when operating the telephone or as a speaker when operating the personal computer. The volume can be regulated by means of the regulator 11.

Figure 6:
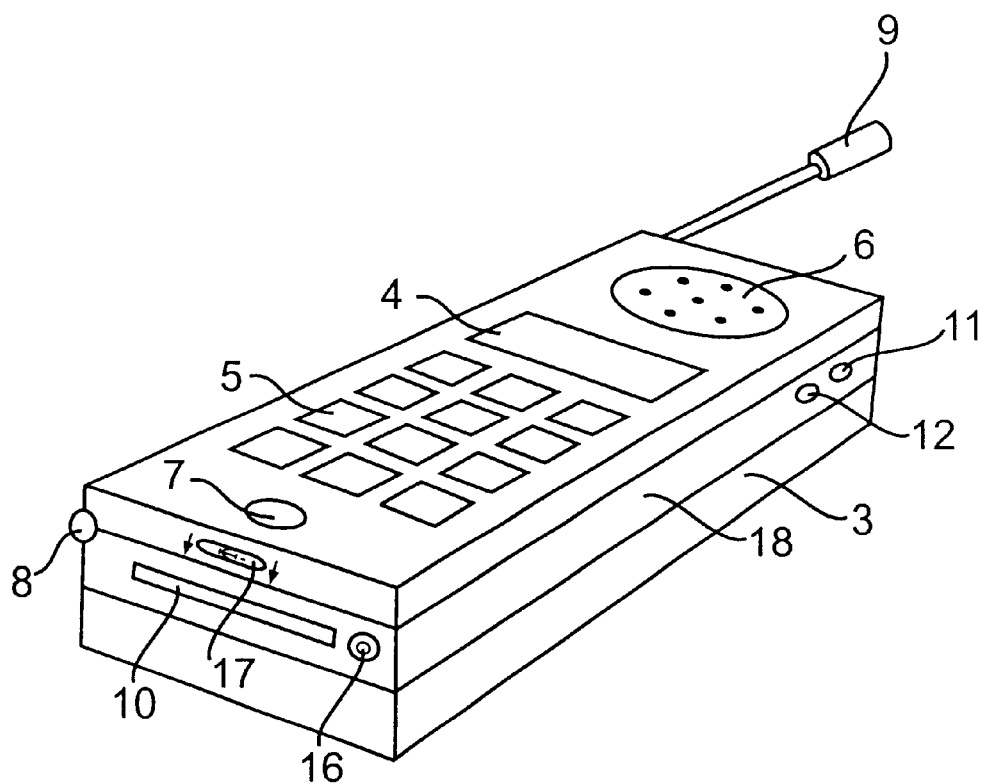
FIG. 6 shows the same device according to the invention as FIG. 5.

FIG. 6 shows the embodiment shown in FIG. 5, but in a closed position. The outside surface of member 1 offers the view of a usual mobile telephone with keys 5 and a display 4 to show telephone numbers or different functions chosen by the user.

No. 16 shows an audio socket to which headphones or earphones or other fitting speakers can be connected. With a combined in- and out- audio socket it will be possible to connect to it a combined microphone/headphone device. In all embodiments shown of the FIGS. 1 to 6, the antenna 9 is shown as a telescope antenna and it first pulled out into position. If the telecommunication unit is not used, the antenna 9 can be removed into the hinge 8. It would not be necessary to draw out or insert the antenna in the case if it would be completely integrated into the housing (which is not shown here) because the functions of sending and receiving would operate even if the antenna would be completely concealed in the hinge, The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hand-held telephone with an integrated computer member having a cordless telecommunication unit and a personal computer with a keyboard and a computer display, the device having at least two flat, elongated members which are joined to on another in a movable way so that in the closed position their inner surfaces are adjacent, the keyboard and the computer display being arranged on the inner surfaces of these two members and the outer surface of one of the members comprise a keyboard for operating the telecommunication unit, the computer module being situated in one member of the device and the telecommunication unit together with the keys for operating the telephone in a second member, a microphone and a speaker being on one of the outer surfaces of the body, the inner surface of the first member having a display for the personal computer and on the outer surface of the first member there is a second display for the telecommunication unit and that the second member containing the personal computer can be extended by additional members, in the closed position, the outer surfaces of the device having at least two member form one unit without any of its parts jutting out.

2. The hand-held telephone according to claim 1, wherein the keys for operating the telecommunication unit and/or the second display for the telecommunication unit are arranged in such a way that the keys for operating the telecommunication unit and the second display are arranged in lines and columns so that the lines form a right angle with the long side of the housing of the device.

3. Hand-held telephone according to claim 1, wherein a power module is either integrated into the member containing the computer or is adjusted to it.

4. Hand-held telephone according to claim 3, wherein the power unit is adjusted to the member containing the personal computer and that the outer surfaces of these two members form one unit without any part jutting out.

5. Hand-held telephone according to claim 3, wherein the power unit comprises an accumulator.

6. Hand-held telephone according to claim 1, wherein the member containing the personal computer and/or other members comprise power storage modules, data storage modules, data processing modules, radio- or tv-tuning modules, additional send/receipt units for the usage of the telecommunication unit, disk or hard disk drives, chip card readers or magnetic card readers, PCMCIA-slots for memory cards, plug connections for parallel and/or serial interfaces and/or other interfaces.

7. Hand-held telephone according to claim 1, wherein the members are connected with one another by hinges, spring catches or others.

8. Hand-held telephone according claim 7, wherein a fixed or movable antenna is integrated into the hinge.

9. Hand-held telephone according to claim 1, wherein a fixed antenna is completely integrated into the member comprising the telecommunication unit.

10. Hand-held telephone according to claim 1, wherein the member containing the personal computer comprises a switch for activating the hands free call function as well as a switch allowing the user to communicate after the dial tone and a volume regulator for adjusting the volume.

11. Hand-held telephone according to claim 1, wherein the telecommunication unit comprises a mobile radio telephone.

12. Hand-held telephone according to claim 1, wherein the keyboard for the personal computer and the computer display can be used to operate and control the telecommunication unit.

13. Hand-held telephone according to claim 1, wherein the computer display represents a touch screen.

14. Hand-held telephone according to claim 1, wherein the lines and columns of the computer keyboard and the computer display are arranged on the inner surfaces of two members being situated opposite to one another in such a way that the lines of the computer keyboard and the computer display form a right angle with the long side of the members.

* * * * *